United States Patent
Martinez et al.

(10) Patent No.: US 11,204,982 B2
(45) Date of Patent: Dec. 21, 2021

(54) STREAMLINING LICENSING ENTITLEMENT

(71) Applicant: International Business Machines Corporation, Armonk, NY (US)

(72) Inventors: Luisa Martinez, Middletown, NY (US); Christopher Eric Fritz, Hyde Park, NY (US); Daniel Acevedo, Milton, NY (US); Edrian Irizarry, Wappingers Falls, NY (US); Keith Joseph Miller, Pawling, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 307 days.

(21) Appl. No.: 16/433,039

(22) Filed: Jun. 6, 2019

(65) Prior Publication Data

US 2020/0387585 A1 Dec. 10, 2020

(51) Int. Cl.
*G06F 21/12* (2013.01)
*G06F 21/10* (2013.01)
*G06F 16/28* (2019.01)

(52) U.S. Cl.
CPC .............. *G06F 21/12* (2013.01); *G06F 16/28* (2019.01); *G06F 21/105* (2013.01); *G06F 2221/0704* (2013.01); *G06F 2221/0775* (2013.01)

(58) Field of Classification Search
CPC ........ G06F 21/12; G06F 21/105; G06F 21/10; G06F 2221/0704
See application file for complete search history.

(56) References Cited

U.S. PATENT DOCUMENTS

| | | | |
|---|---|---|---|
| 7,506,053 B1 | 3/2009 | Qin | |
| 10,033,702 B2 | 7/2018 | Ford | |
| 2011/0302574 A1* | 12/2011 | Yoshikawa | G06F 8/65 717/173 |
| 2014/0236846 A1* | 8/2014 | Melika | G06Q 10/06 705/310 |
| 2017/0316185 A1 | 11/2017 | Park | |
| 2018/0183606 A1* | 6/2018 | High | H04L 9/3239 |
| 2018/0293363 A1* | 10/2018 | Asati | G06F 21/64 |

(Continued)

OTHER PUBLICATIONS

Andreas Schaad, "The Blockchain. A Viable Choice for Software Licensing?" Digitale Welt Magazine, URL: https://digitaleweltmagazin.de/en/2017/09/12/blockchain-realistischer-einsatz-in-der-softwarelizenzierung/. Posted Sep. 12, 2017. 3 pages.

(Continued)

*Primary Examiner* — David J Pearson
(74) *Attorney, Agent, or Firm* — Cantor Colburn.LLP; Teddi Maranzano

(57) ABSTRACT

A software licensing verification and installation system includes a client computing system in signal communication with a service provider computing system. The client computing system is configured to generate a request for at least one software product. The service provider computing system is configured to determine hardware information and software information of the client computing system, to receive a client license provided by the client computing system corresponding to the at least one software product, and to verify the client license based on the hardware information and software information.

14 Claims, 7 Drawing Sheets

(56) References Cited

U.S. PATENT DOCUMENTS

2019/0303541 A1* 10/2019 Reddy .................. H04L 9/0643
2020/0334032 A1* 10/2020 Smith .................... G06F 21/64

OTHER PUBLICATIONS

Anonymous, "Cognitive software bundling, license reconciliation and optimization," IP.com; IPCOM000250856D. Published Sep. 11, 2017. 3 pages.

Anonymous, "Method and Apparatus for Application Driven Blockchain Trust Selection System in Blockchain Fabric," IP.com; IPCOM000246059D. Published Apr. 29, 2016. 5 pages.

Anonymous, "Software License Reconciliation Maintenance Processing," IP.com; IPCOM000224590D. Jan. 2, 2013. 5 pages.

Anonymous, "System and Method for Software Asset Management Powered by Blockchain and Smart Contracts," IP.com; IPCOM000248083D. Published Oct. 24, 2016. 6 pages.

Rocamora et al., "Blockchain Applications and the Sustainable Development Goals," Institure for Global Environmental Strategies (IGES). Aug. 31, 2018. 104 pages.

\* cited by examiner

STREAMLINING LICENSING ENTITLEMENT

BACKGROUND

The present invention relates generally to the field of computing. More specifically, the present invention relates to systems and methodologies for improving software licensing entitlement and software recommendations.

Client computer systems using a licensed software product typically require a customer to manually perform various steps in order to install and/or update the licensed software on the customer's desired machine, network, system image (e.g., logical partition (LPAR)), etc. These steps include acquiring a license key corresponding to the software product. The customer utilizes a software purchasing interface on the client-side network to purchase a licensing key, and receive a web-based link or email containing the purchased key. The purchased key allows the customer to utilize a software tool, which serves as a package manager to download and install the licensed software service or product.

SUMMARY

One or more non-limiting embodiments of the invention are directed to a software licensing verification and installation system. The software licensing verification and installation system includes a service provider computing system in signal communication with a client computing system to receive a request for at least one software product from the client computing system. The service provider computing system is configured to determine hardware information and software information of the client computing system, to receive a client license provided by the client computing system corresponding to the at least one software product, and to verify the client license based on the hardware information and software information.

One or more embodiments of the invention are directed to a method of verifying a software license between a customer and a service provider. The method comprises generating a request for at least one software product via a client computing system; and receiving, at a service provider computing system, the request for the client computing system and determining at least one of hardware information and software information of the client computing system. The method further comprises delivering a client license from the client computing system to the at least one software product, and verifying, via the service provider computing system, the client license based on the hardware information and software information.

One or more embodiments of the invention are directed to a computer program product to verify a software license between a customer and a service provider. The computer program product comprises a computer readable storage medium having program instructions embodied therewith. The program instructions are executable by an electronic computer processor to control the electronic device to perform operations comprising generating a request for at least one software product via a client computing system, and receiving, at a service provider computing system, the request for the client computing system and determining at least one of hardware information and software information of the client computing system. The method further comprises delivering a client license from the client computing system to the at least one software product, and verifying, via the service provider computing system, the client license based on the hardware information and software information.

Additional features and advantages are realized through techniques described herein. Other embodiments and aspects are described in detail herein. For a better understanding, refer to the description and to the drawings.

BRIEF DESCRIPTION OF THE DRAWINGS

The subject matter that is regarded as embodiments is particularly pointed out and distinctly claimed in the claims at the conclusion of the specification. The foregoing and other features and advantages of the embodiments are apparent from the following detailed description taken in conjunction with the accompanying drawings in which:

DETAILED DESCRIPTION

Figure 1:
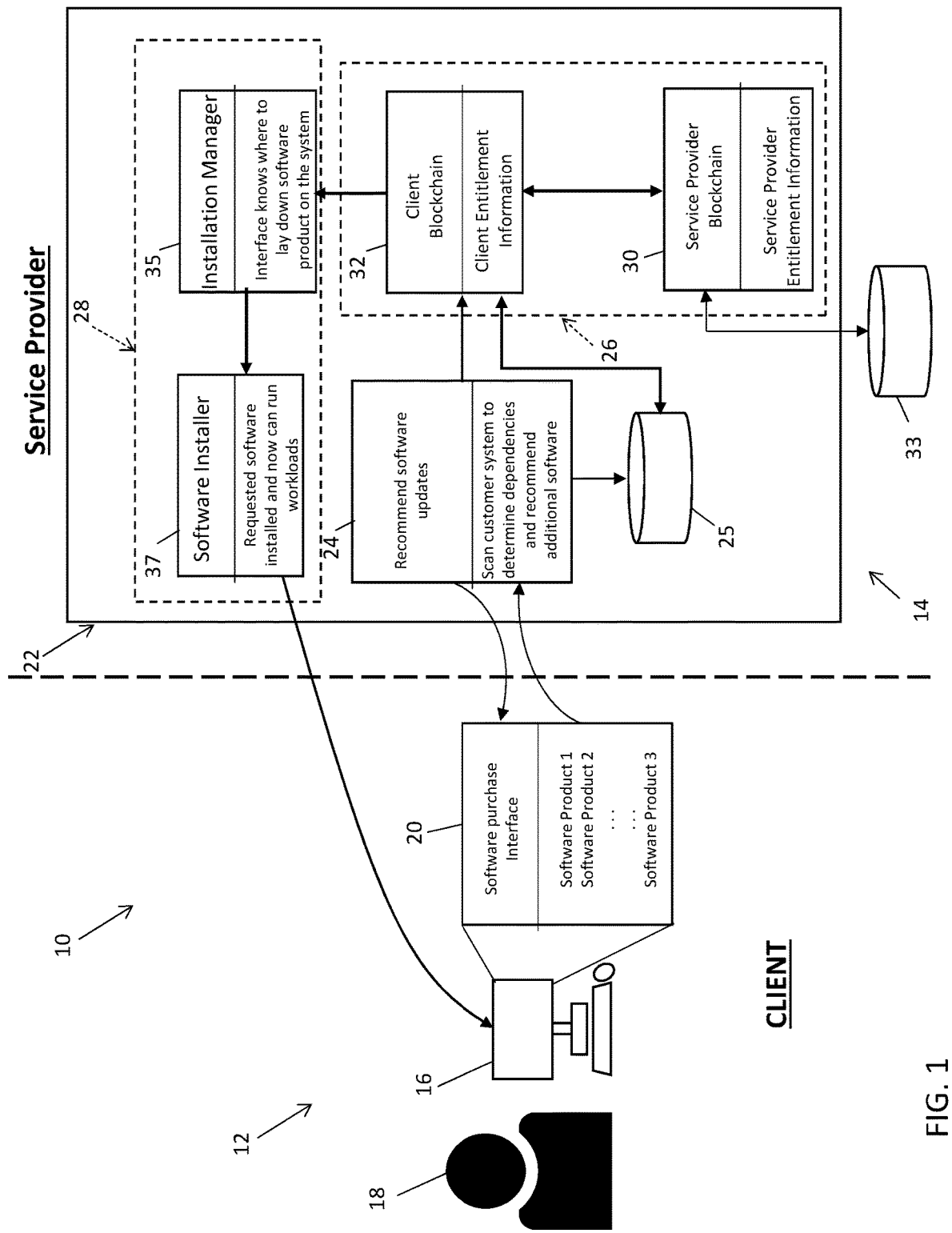
FIG. 1 is a block diagram illustrating a system configured to facilitate software licensing entitlement and software installation between a customer and service provider according to a non-limiting embodiment.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computer systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of embodiments of the invention, license keys associated with licensed software products are conventionally stored in an inconsistent and fragmented way, depending on the product. For example, some service providers manage license keys using spreadsheets that are stored in a cloud server, a remote database, or a computer system. Service providers, however, do not analyze a client's or customer's hardware to validate software licenses, acquire dependencies, and then install the licensed software on the customer's system. On the contrary, service providers require manual intervention from client managers or client-side information technology (IT) professionals to facilitate licensing validation and software installation.

Turning now to an overview of the aspects of embodiments of the invention, one or more embodiments of the invention address the above-described shortcomings of the prior art by providing a system capable of streamlining licensing entitlement using a tamper proof custom distributed ledger such as blockchain, for example, in order to verify entitlement packages and licensing keys. In one or more embodiments, the blockchain ledger serves as a data storage element that records or encodes a license corresponding to a software product. The system also provides software recommendations using a machine learning algorithm to generate a list of recommended software products by analyzing the customer's hardware and/or software dependencies. In one or more non-limiting embodiments, a clustering learning algorithm is utilized; however, it should be appreciated that the invention is not limited thereto. To generate the recommendation, both hardware and software on the customer's system is analyzed across an aggregate customer database. Once licensing is verified, customers are authorized to obtain automatic installation of the chosen software products and dependencies onto the customer's system.

In one or more non-limiting embodiments, the system gathers the customer's local machine and system image (e.g., LPAR information), and then performs a validation operation of the customer's license provided in attempt to install a software product. In one or more embodiments, the service provider system can also determine additional software products, updates and/or dependencies based on the customer's hardware, current software products and/or requested licenses, and present the customer with a list of the additional software products for available installation. Once a final request for the software product(s) are submitted by the customer, the service provider system obtains the software product(s) along with any dependencies, and automatically installs the software onto the customer's system without the customer's manual intervention.

With reference now to FIG. 1, a system 10 configured to facilitate software licensing entitlement and software recommendations between a customer computing network 12 and service provider computing network 14 is illustrated according to a non-limiting embodiment. The customer computing network 12 includes a client computer system 16 operable by a customer or user 18. The user 18 includes, for example, a client manager or client-side information technology (IT) professional. The client computer system 16 provides the user 18 with an interface 20, which allows the user 18 to interact with the service provider network 14.

The service provider network 14 includes a service provider computer system 22 capable of exchanging data with the client computer system 16 and operating a backend software purchasing environment. The service provider computer system 22 includes a software recommendation module 24, a license verification module 26, and a software installation module 28. Any one of the software recommendation module 24, license verification module 26, and software installation module 28 can be constructed as an electronic hardware controller that includes memory and a processor configured to execute algorithms and computer-readable program instructions stored in the memory.

The software recommendation module 24 is configured to determine software products that are similar to those currently utilized by the customer 18 and/or currently installed on the client computing system 16. In one or more examples, the software recommendation module 24 can scan the client computing system 16 to determine the customer's current hardware and software. The software recommendation module 24 can then generate a similarity score based on the customer's hardware and software. In some embodiments, a machine-learning algorithm can be used to assign the similarity score. The similarity score can be configured such that a higher similarity score indicates a higher similarity between a customer's current software and additional software and/or dependencies stored in a software data base 25, but not utilized by the customer and/or not installed on the client computing system 16. The software recommendation module 24 then generates a data file configured to generate a recommendation list containing additional software products and/or software updates having a similarity score above a score threshold. The data file is then delivered to the client computing system 16 and in response to receiving the data file the interface 20 displays the recommendation list displayed to the customer 18. The customer 18 utilizes the interface 20 to select one or more requested software products, updates and/or dependencies included in the recommendation list.

The license verification module 26, performs license verification on the software products, updates and/or dependencies selected by the customer 18. In one or more embodiments, the license verification module 26 includes a service provider ledger module 30 and a client ledger module 32. Any one of the ledger module 30 and the client ledger module 32 can be constructed as an electronic hardware controller that includes memory and a processor configured to execute algorithms and computer-readable program instructions stored in the memory.

The service provider ledger module 30 is configured to obtain a custom distributed ledger such as a blockchain ledger, for example, stored in a ledger database 33. The distributed ledgers store authenticated licenses corresponding to one or more software products, updates and/or dependencies that are provided to customers upon payment from the customer to use a given software product, update and/or dependency. Although blockchain ledgers are described here as an example, other ledgers can be implemented.

The client ledger module 32 analyzes a client blockchain ledger provided by the client computing system 16. The client blockchain ledger stores a data record indicating a license(s) corresponding to the requested software products, updates and/or dependencies selected by the customer 18. The client ledger module 32 obtains the stored blockchain ledgers from the service provider ledger module 30, correspond to the software products, updates and/or dependencies requested from the customer. Accordingly, the client ledger module 32 compares the client blockchain ledger to the stored blockchain ledger. When license(s) included in the client blockchain ledger match the authenticated license(s) stored in the server blockchain ledger, the license verification module 26 determines that the customer 18 is authorized to install the corresponding software products, updates and/or dependencies. The license verification module 26 denies a customer's installation request when a license(s) included in the client blockchain ledger fails to match a stored license(s). Accordingly, the client ledger module 32 obtains the authorized software products, updates and/or dependencies from the software database 25 and delivers the software to the software installation module 28.

The software installation module 28 includes a software installation manager 35 and a software installer 37. Any one of the software installation manager 35 and the software installer 37 can be constructed as an electronic hardware controller that includes memory and a processor configured to execute algorithms and computer-readable program instructions stored in the memory.

The software installation manager 35 can access a database (not shown) that contains a record of the hardware and software installation destinations of the client computer network 16. Accordingly, the software installation manager 35 relays the requested software products, updates and/or dependencies and determined installation destination to the software installer 37. In turn, the software installer 37 accesses the client computer system 16 and automatically installs the requested software products, updates and/or dependencies at the installation destination(s) without the customer's manual intervention. Once installed, the software installer 37 can alert the customer 18 that the installation is complete (e.g., an alert displayed on the interface 20).

Figure 2:
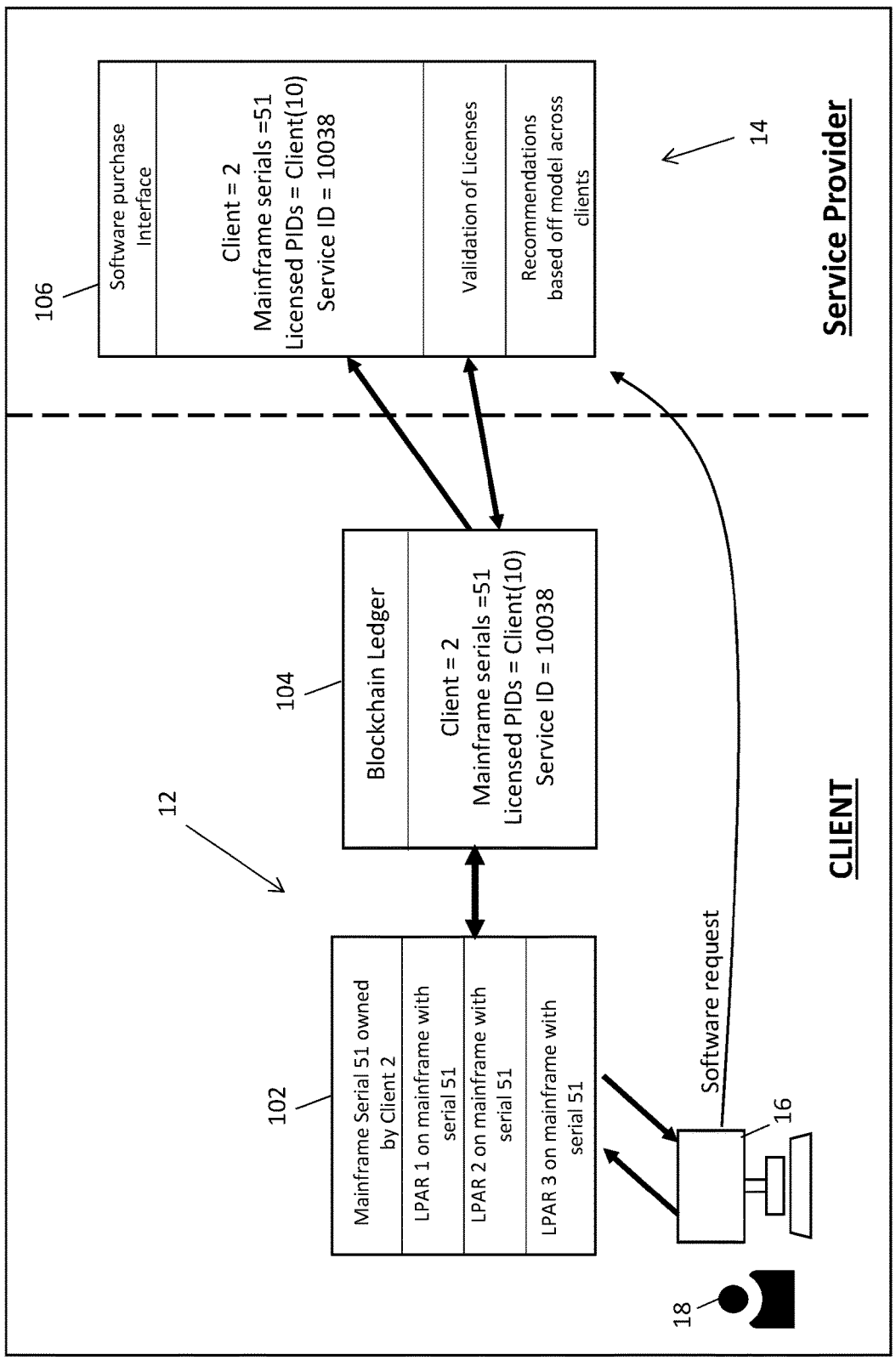
FIG. 2 is a block diagram illustrating a process of verifying a software license between a customer and service provider according to a non-limiting embodiment.

FIG. 2 is a block diagram illustrating a process of verifying a software license between a customer computing network 12 and service provider computing network 14 according to a non-limiting embodiment. The client computer system 16 can include a mainframe environment 102 identified by a mainframe serial identification (ID). The mainframe environment 102 can further include one or more system images, e.g., one or more LPARs (e.g., LPAR1, LPAR2, LPAR3, etc.) having workloads distributed thereacross. Accordingly, the customer computing network 12 can be assigned a unique client blockchain ledger 104 based on the information of the mainframe environment 102 and system image (e.g., LPARs), along with other customer data including, but not limited to, a client ID, a license process identifier (PID), and a service ID.

The service provider network 14 manages and operates a backend software purchasing environment 106. In response to receiving a request from the customer computing network 12 to install one or more software products, updates and/or dependencies, the backend software purchasing environment 106 obtains the client blockchain ledger 104 from the client computing network, performs a license verification process based on the client blockchain ledger 104. The backend software purchasing environment 106 also can automatically communicate recommendations on additional licensed software products to the customer computing network 12 based on the mainframe environment 102, LPARs and customer data included in the client blockchain ledger 104.

Figure 3:
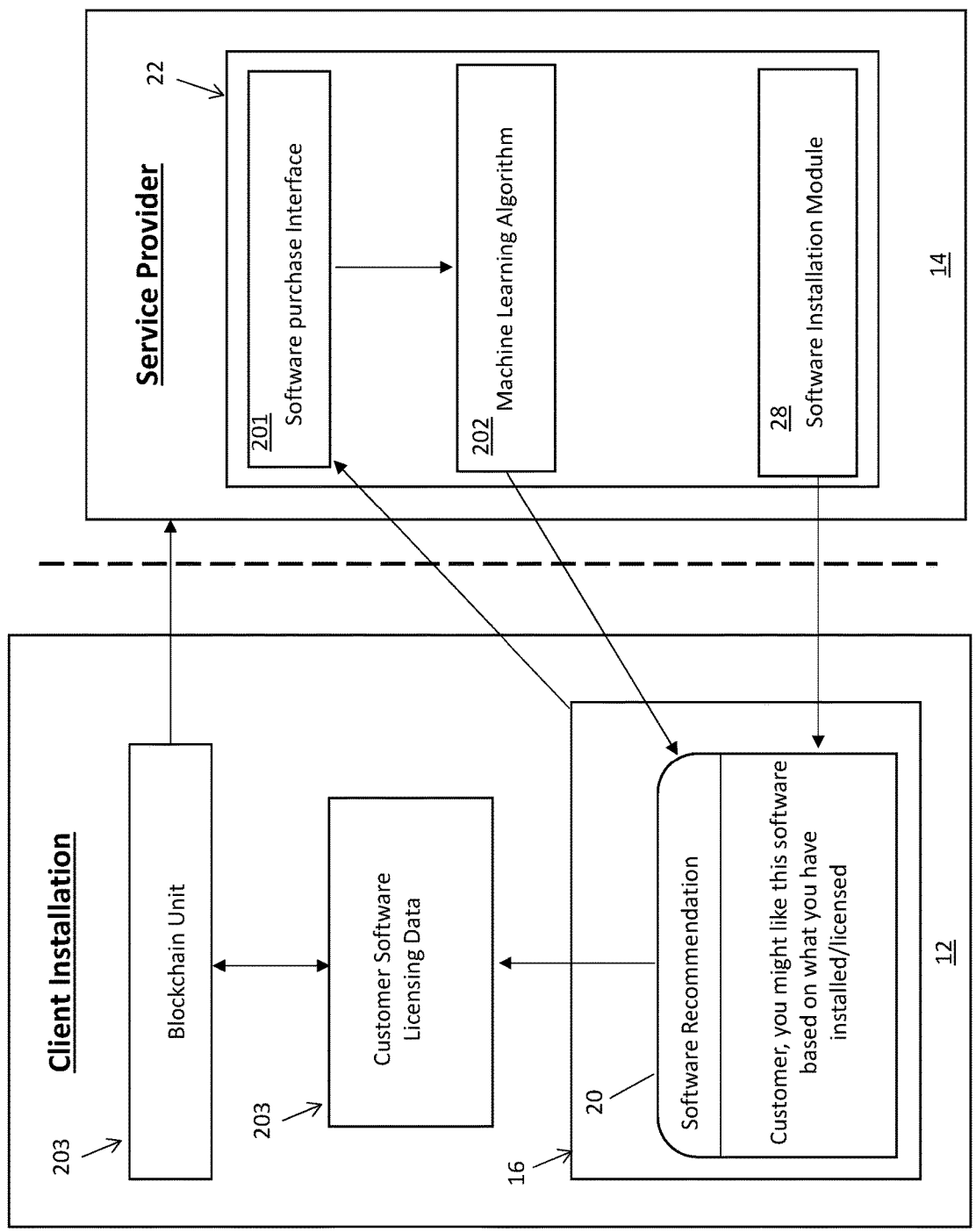
FIG. 3 is a block diagram illustrating a process of installing software exchanged between a service provider and a customer following verification of a license according to a non-limiting embodiment.

FIG. 3 is a block diagram illustrating a process of installing software exchanged between a service provider network 14 and a client computing network 12 following verification of a license according to a non-limiting embodiment. In response to receiving at the service provider's software purchase interface 201 the customer's request to install one or more software products, updates and/or dependencies, the service provider's machine learning algorithm 202 determines whether there are additional software and/or dependencies available for installation, but not utilized by the customer and/or not installed on the client computing system 16. Once the customer submits a final selection of requested software products, updates and/or dependencies, the client computing system 12 generates the corresponding customer licensing data, which is then submitted to a client-side ledger unit 203. The client-side ledger unit 203 utilizes the licensing date along with the customer's current hardware and software to generate a tamper proof custom ledger such as, for example, a blockchain. In response to verifying the customer's licenses based on the blockchain ledger, the service provider's software installation module 28 automatically installs the requested software products, updates and/or dependencies on the customer's client computer system 16.

Figure 4:
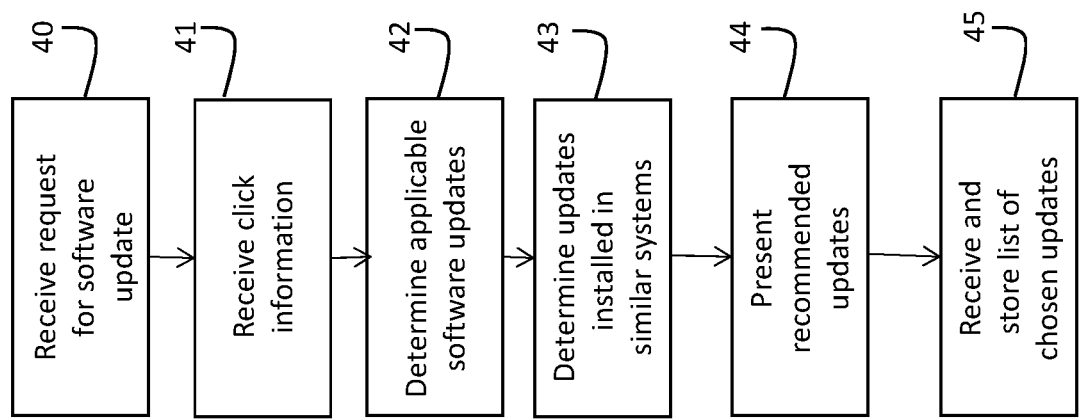
FIG. 4 is a flow diagram illustrating a method of recommending software to a customer according to a non-limiting embodiment.

FIG. 4 illustrates a method of recommending software to a customer according to a non-limiting embodiment. At operation 40, a request is received from a requesting computer system for a software update (also known as a patch or PTF). At operation 41, click data is gathered from the requesting computer system. The click data includes, for example, information about the computer system, including the hardware of the system and the software included in the system. The clicks also include the specifics as to the applicability of each software update to the particular computer system. In addition, order data can be used in unison with other segmented customer order data to recommend the software updates based off other similar customer setups. In some embodiments, the order data acts as a type of proxy to represent a similar customer's setup without having to transmit detailed information about the computer system specifications.

At operation 42, applicable software updates are determined by the service provider and can be a subset of all available software updates, based on the installed hardware and software of the requesting computer system. To take a simplified example, a patch for a specific storage unit will only apply to a computer system that includes that particular storage unit. On the other hand, a computer system that includes a dozen storage units will find the patch more applicable than it will be to a computer system that includes a single storage unit. The same process can occur for software. For example, software installed on the requesting computer system is determined such that the software updates that are appropriate to the requesting computer can be determined. For example, a software update specific to software that is not installed on the requesting computer system is deemed not necessary for the requesting computer system. In addition, when a software update is due to an interaction between two pieces of software or between specific hardware and software combination can be deemed not necessary if the requesting computer system does not include the software or hardware of the software update.

At operation 43, software updates that were most commonly installed in similar computer systems are determined. This can first involve determining similar computer systems. Similarity between computer systems can be determined in a variety of different manners. For example, a similarity score can be assigned based on the similarity of hardware and software. In some embodiments, a machine-learning algorithm such as a clustering learning algorithm, for example, can be used to assign the similarity score. It should be appreciated that other machine-learning algorithms can be implemented. The similarity score can be configured such that a higher similarity score indicates a higher similarity between the hardware and software of various computer systems. The software updates of systems with a similarity score above a certain score can be placed in a list. In one or more embodiments, a machine-learning algorithm is employed by the service provider to determine which similarity scores are determined to be relevant.

At operation 44, a list of recommended updates is presented to the customer computer system. The list can be the one generated by the service provider system in response to determining the most commonly installed software updates in similar computer system. Using the list of recommended software updates, a user of the customer computer system can choose which software updates to install, and in response to receiving the customer's selection the service provider system sends the requested software products at operation 45. In one or more embodiments, the service provider system determines the customer's set location to store the software product following analysis of the customer's hardware, and automatically installs the software product(s) on the customer's system.

Figure 5:
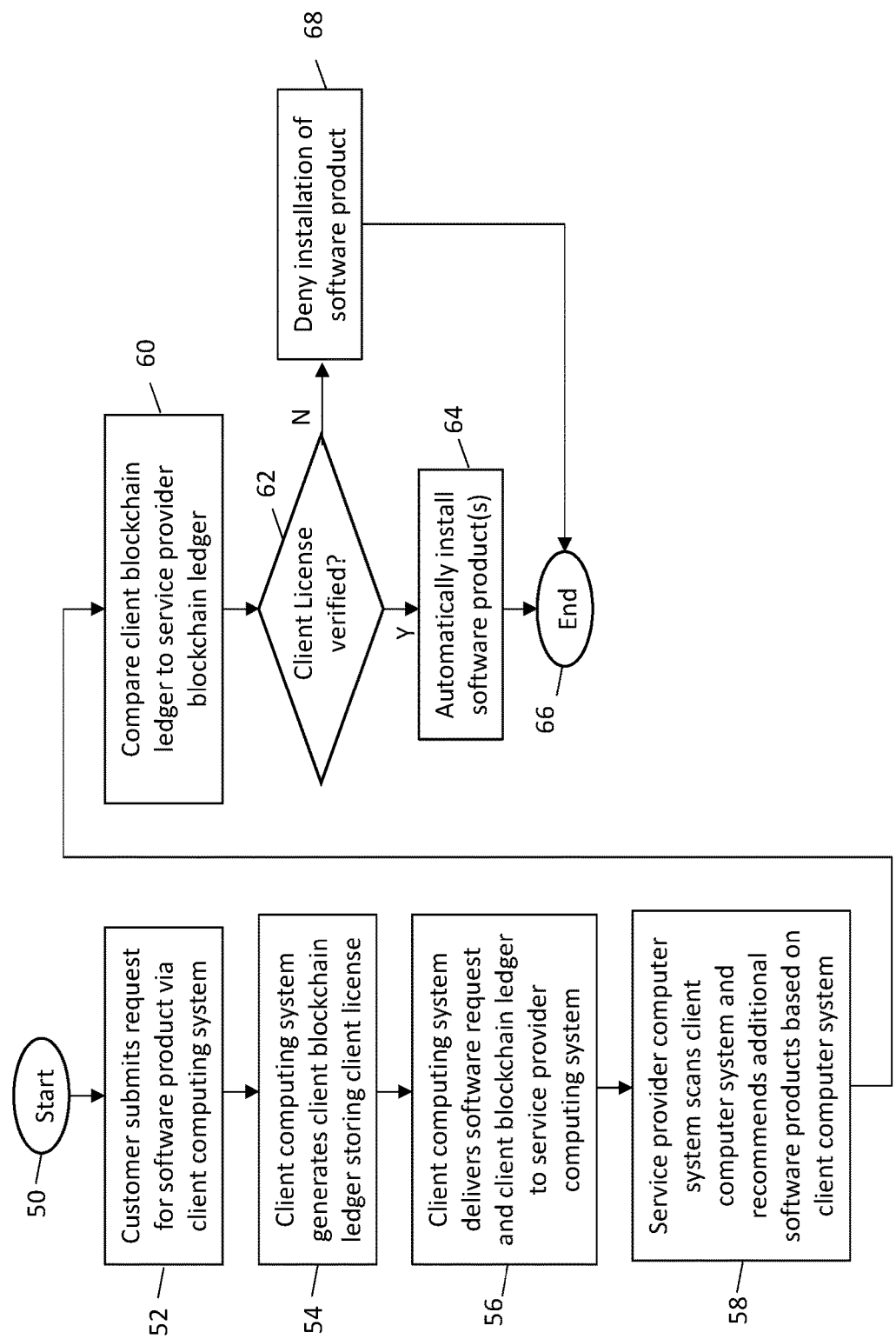
FIG. 5 is a flow diagram illustrating a method of verifying a software license between a customer and a service provider according to a non-limiting embodiment.

Turning now to FIG. 5, a method of verifying a software license between a customer and a service provider is illustrated according to a non-limiting embodiment. The method begins at operation 50, and at operation 52 a customer submits a request for one or more software products via a client computing system. At operation 54, the client computing system generates a client blockchain ledger which store a client license corresponding to the requested software product. At operation 56, the client computing system delivers the software installation request and the client blockchain ledger to a service provider that provides the requested software product. At operation 58, the service provider computing system scans the client computing system to determine the customer's hardware and software, and exchanges data with the client computing system to recommend additional software products to the customer.

At operation 60, the service provider computing network compares the client blockchain ledger to a service provider blockchain ledger storing an authenticated license corresponding to the requested software product. When the client license matches the authenticated license, the client license is verified at operation 62. Accordingly, the software product is automatically installed on the client computing network without the customer's manual intervention at operation 64, and the method ends at operation 66. When, however, the client license does not match the authenticated license, the client license is not verified at operation 62. Accordingly, the customer's request to install the software product is denied at operation 68, and the method ends at operation 66.

Figure 6:
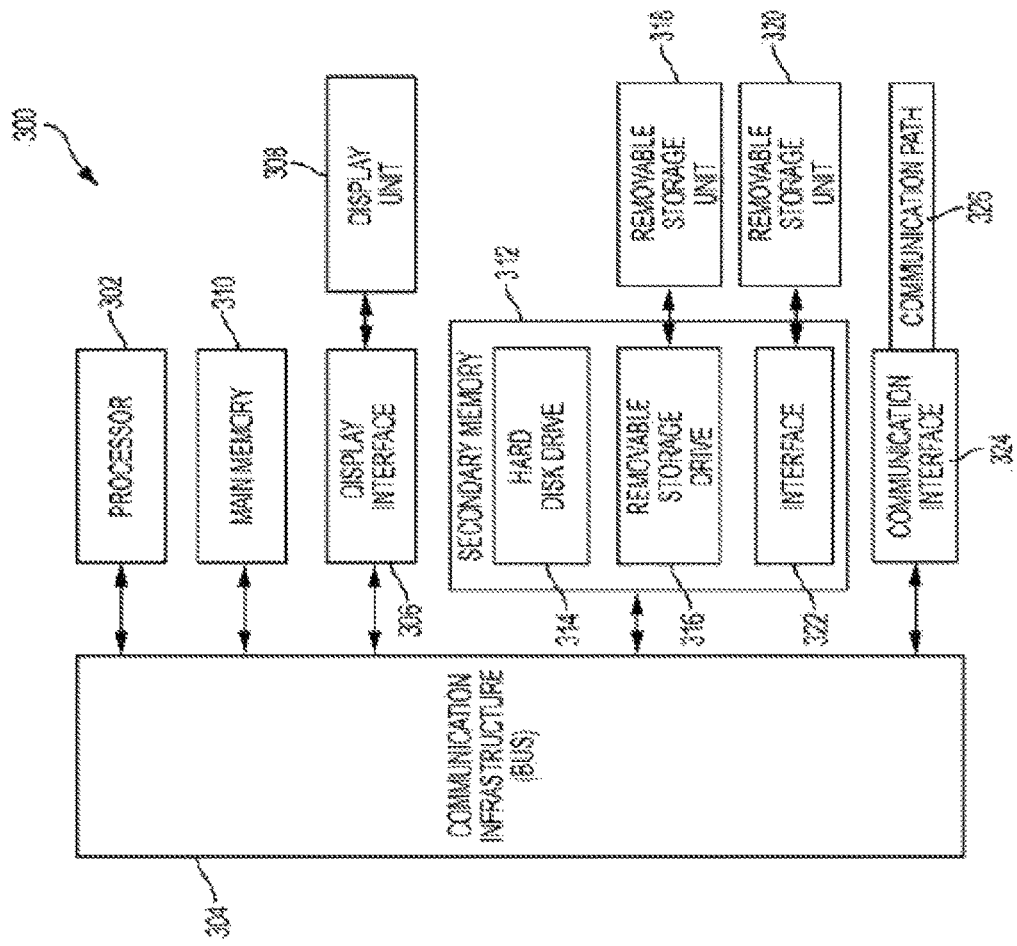
FIG. 6 is a block diagram illustrating a computing system capable of streamlining licensing entitlement and installing a software product.

FIG. 6 depicts a computer system 300, which can be used to implement one or more embodiments. More specifically, computer system 300 can be used to implement hardware components of systems capable of performing methods described herein. Although one exemplary computer system 300 is shown, computer system 300 includes a communication path 326, which connects computer system 300 to additional systems (not depicted) and can include one or more wide area networks (WANs) and/or local area networks (LANs) such as the Internet, intranet(s), and/or wireless communication network(s). Computer system 300 and additional system are in communication via communication path 326, e.g., to communicate data between them.

Computer system 300 includes one or more processors, such as processor 302. Processor 302 is connected to a communication infrastructure 304 (e.g., a communications bus, cross-over bar, or network). Computer system 300 can include a display interface 306 that forwards graphics, textual content, and other data from communication infrastructure 304 (or from a frame buffer not shown) for display on a display unit 308. Computer system 300 also includes a main memory 310, preferably random access memory (RAM), and can also include a secondary memory 312. Secondary memory 312 can include, for example, a hard disk drive 314 and/or a removable storage drive 316, representing, for example, a floppy disk drive, a magnetic tape drive, or an optical disc drive. Hard disk drive 314 can be in the form of a solid state drive (SSD), a traditional magnetic disk drive, or a hybrid of the two. There also can be more than one hard disk drive 314 contained within secondary memory 312. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disc, etc. which is read by and written to by removable storage drive 316. As will be appreciated, removable storage unit 318 includes a computer-readable medium having stored therein computer software and/or data.

In alternative embodiments, secondary memory 312 can include other similar means for allowing computer programs or other instructions to be loaded into the computer system. Such means can include, for example, a removable storage unit 320 and an interface 322. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 320 and interfaces 322 which allow software and data to be transferred from the removable storage unit 320 to computer system 300.

Computer system 300 can also include a communications interface 324. Communications interface 324 allows software and data to be transferred between the computer system and external devices. Examples of communications interface 324 can include a modem, a network interface (such as an Ethernet card), a communications port, or a PC card slot and card, a universal serial bus port (USB), and the like. Software and data transferred via communications interface 324 are in the form of signals that can be, for example, electronic, electromagnetic, optical, or other signals capable of being received by communications interface 324. These signals are provided to communications interface 324 via communication path (i.e., channel) 326. Communication path 326 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 310 and secondary memory 312, removable storage drive 316, and a hard disk installed in hard disk drive 314. Computer programs (also called computer control logic) are stored in main memory 310 and/or secondary memory 312. Computer programs also can be received via communications interface 324. Such computer programs, when run, enable the computer system to perform the features discussed herein. In particular, the computer programs, when run, enable processor 302 to perform the features of the computer system. Accordingly, such computer programs represent controllers of the computer system. Thus it can be seen from the forgoing detailed description that one or more embodiments provide technical benefits and advantages.

Figure 7:
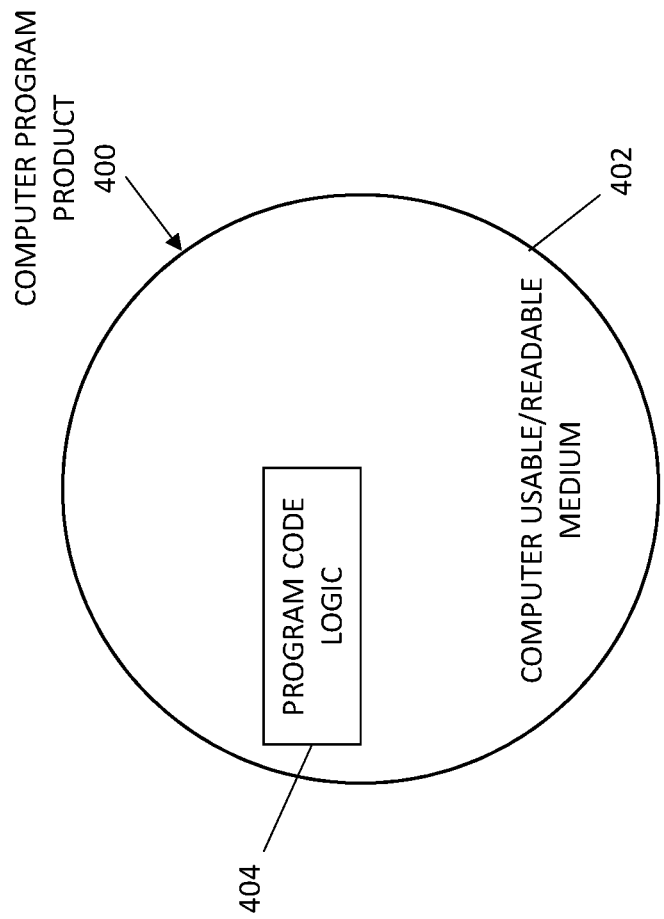
FIG. 7 is a block diagram illustrating a computer program product capable of facilitating a method of verifying a software license and installing a software product between a client and service provider according to a non-limiting embodiment.

Referring now to FIG. 7, a computer program product 400 in accordance with an embodiment that includes a computer-readable storage medium 402 and program instructions 404 is generally shown.

Embodiments can be a system, a method, and/or a computer program product. The computer program product can include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform embodiments of the present invention.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but are not intended to be exhaustive or limited. Many modifications and variations will be apparent to those of ordinary skill in the art without departing from the scope and spirit of embodiments of the invention. The embodiment was chosen and described in order to best explain the principles of operation and the practical application, and to enable others of ordinary skill in the art to understand embodiments of the present invention for various embodiments with various modifications as are suited to the particular use contemplated.

What is claimed is:

1. A software licensing verification and installation system comprising:
    a service provider computing system configured to receive a request for at least one software product, the service provider computing system further configured to determine at least one of hardware information and software information of a client computing system, to receive a client license provided by the client computing system corresponding to the at least one software product, and to verify the client license based on the at least one of hardware information and software information,
    wherein the client computing system generates a client distributed ledger storing the client license along with current software and current hardware installed on the client computing system, the current hardware including at least one system image of a logical partition (LPAR) included in the client computing system, and
    wherein the service provider computer system stores at least one server distributed ledger storing an authentic license corresponding to the software product and verifies the client license based on a comparison between the client distributed ledger and the server distributed ledger.

2. The system of claim 1, wherein client distributed ledger and the at least one server ledger are blockchain ledgers, and wherein the client distributed ledger further stores the at least one of hardware information and software information.

3. The system of claim 1, wherein the service provider computer system generates a data file containing at least one of an additional software product, a software update to the software product, and a dependency of the software product based on the client distributed ledger.

4. The system of claim 3, wherein the client computing system displays a recommendation of the at least one of an additional software product, a software update to the software product, and a dependency of the software product in response to receiving the data file, and generates the client distributed ledger storing at least one license corresponding to the at least one of an additional software product, a software update to the software product, and a dependency of the software product.

5. The system of claim 1, wherein the service provider computer system determines an installation destination on the client computing system based on the at least one of hardware information and software information, and automatically installs the software product on the client computing system without the customer's manual intervention.

6. A method of verifying a software license between a customer and a service provider, the method comprising:
    receiving, at a service provider computing system, a request for at least one software product and determining at least one of hardware information and software information of the client computing system;
    receiving, at the service provider computing system, a client license provided by the client computing system;
    verifying, via the service provider computing system, the client license based on the at least one of hardware information and software information;
    generating, via the client computing system, a client distributed ledger storing the client license along with current software and current hardware installed on the client computing system, the current hardware including at least one system image of a logical partition (LPAR) included in the client computing system;
    storing, via the service provider computer system, at least one server distributed ledger storing an authentic license corresponding to the software product; and
    verifying, via the service provider computer system, the client license based on a comparison between the client distributed ledger and the server distributed ledger.

7. The method of claim 6, further comprising storing the at least one of hardware information and software information in the client distributed ledger.

8. The method of claim 6, further comprising generating, via the service provider computing system, a data file containing at least one of an additional software product, a software update to the software product, and a dependency of the software product based on the client distributed ledger.

9. The method of claim 8, further comprising:
displaying, via the client computing system, a recommendation of the at least one of an additional software product, a software update to the software product, and a dependency of the software product in response to receiving the data file from the service provider computing system; and
generating the client distributed ledger storing at least one license corresponding to the at least one of an additional software product, a software update to the software product, and a dependency of the software product.

10. The method of claim 6, further comprising:
determining, via service provider computing system, an installation destination on the client computing system based on the at least one of hardware information and software information; and
automatically installing, via the service provider computing system, the software product on the client computing system without the customer's manual intervention.

11. A computer program product to verify a software license between a customer and a service provider, the computer program product comprising a computer readable storage medium having program instructions embodied therewith, the program instructions executable by an electronic computer processor to control the electronic device to perform operations comprising:
receiving, at a service provider computing system, a request for at least one software product and determining at least one of hardware information and software information of the client computing system;
receiving, at the service provider computing system;
verifying, via the service provider computing system, the client license based on the at least one of hardware information and software information;
generating, via the client computing system, a client distributed ledger storing the client license along with current software and current hardware installed on the client computing system, the current hardware including at least one system image of a logical partition (LPAR) included in the client computing system;
storing, via the service provider computer system, at least one server distributed ledger storing an authentic license corresponding to the software product; and
verifying, via the service provider computer system, the client license based on a comparison between the client distributed ledger and the server distributed ledger.

12. The computer program product of claim 11, wherein the operations further comprise storing the at least one of hardware information and software information in the client distributed ledger.

13. The computer program product of claim 11, wherein the operations further comprise:
generating, via the service provider computing system, a data file containing at least one of an additional software product, a software update to the software product, and a dependency of the software product based on the client distributed ledger;
displaying, via the client computing system, a recommendation of the at least one of an additional software product, a software update to the software product, and a dependency of the software product in response to receiving the data file from the service provider computing system; and
generating the client distributed ledger storing at least one license corresponding to the at least one of an additional software product, a software update to the software product, and a dependency of the software product.

14. The computer program product of claim 11, wherein the operations further comprise:
determining, via service provider computing system, an installation destination on the client computing system based on the at least one of hardware information and software information; and
automatically installing, via the service provider computing system, the software product on the client computing system without the customer's manual intervention.

* * * * *